S. S. MYERS.
Fruit-Gatherer.
No. 220,409.                    Patented Oct. 7, 1879.
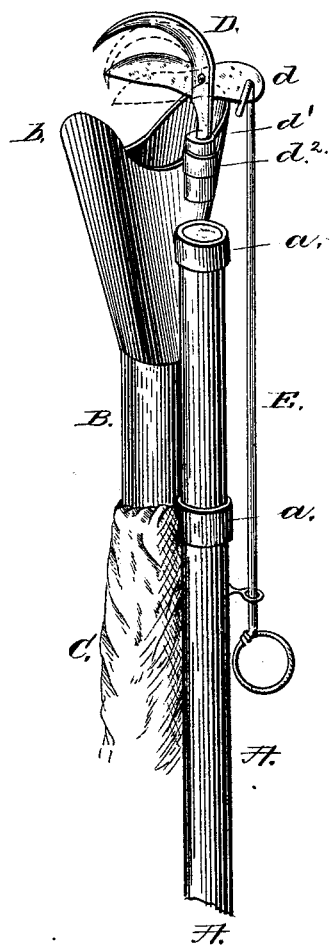
Witnesses:
J. Walter Fowler.
John O'Donoghue.
Inventor:
Silas S. Myers
By H. J. Ennis
att'y

UNITED STATES PATENT OFFICE.

SILAS S. MYERS, OF HAWKINSVILLE, FLORIDA.

IMPROVEMENT IN FRUIT-GATHERERS.

Specification forming part of Letters Patent No. 220,409, dated October 7, 1879; application filed May 23, 1879.

*To all whom it may concern:*

Be it known that I, SILAS S. MYERS, of Hawkinsville, in the county of Orange and State of Florida, have invented certain new and useful Improvements in Fruit-Gatherers; and I do hereby declare that the following is a full, clear, and exact description of the invention, which will enable others skilled in the art to which it appertains to make and use the same, reference being had to the accompanying drawing, and to the letters of reference marked thereon, which form a part of this specification.

The figure fully illustrates my invention.

My invention relates to a fruit-gatherer; and the novelty consists in the construction and arrangement of parts, as will be more fully hereinafter set forth.

By my invention I not only cut the stem so as to avoid injuring the rind of the fruit, such as oranges, but by swiveling the cutting device I am enabled to turn unripe or decayed fruit out of the receiver upon either side, and allow it to fall to waste, while the good fruit may readily, at will, be turned into the receptacle.

The important feature of the invention lies in the pivoted or loosely-acting cutting device, so arranged that the operator can turn the same at will to turn the severed fruit either into the receptacle or upon the outside of the same, as will readily be seen. By this construction I not only thus separate the fruit, but obnoxious portions may be pruned to waste, as may be desired.

In carrying out my invention I employ a rod of suitable length fixed in sockets upon a flaring-mouthed receiver, as shown. A flexible tube, of canvas cloth or the like, connects with the lower end or outlet, and leads to the hand of the operator or a receptacle, as may be desired. Swiveled or pivoted in suitable guides upon the receiver is the cutting device, the lower jaw of which is operated by a rod of suitable material, by which rod also the entire cutting device can be turned to the right or left by the operator at will.

I do not confine myself to the precise construction of the cutting device and its connections, as various changes may be made without departing from the principle of my invention, the essential element of which is the swiveled cutter and operating-rod.

Referring to the drawing, A represents the pole or rod, secured in sockets $a$ upon the receiver B, having flaring mouth $b$, as shown. From the lower end of the receiver B is a flexible tube, C, of cloth, which leads the fruit to the operator without bruising the same.

Swiveled at $d^1$ within a socket, $d^2$, is a cutting device, D, to the lower jaw, $d$, of which is secured an operating-rod, E, which extends down within easy reach of the operator.

From the foregoing description the operation of the device is obvious.

What I claim as new is—

The fruit-gatherer described, consisting of the rod A, the receiver B, having flaring mouth $b$ and sockets $a$, the swiveled cutter D, pivoted at $d^1$ in the socket $d^2$, and having the rod E secured to the lower jaw, $d$, thereof, and the flexible conveyer C, as and for the purpose described.

In testimony that I claim the foregoing as my own I hereby affix my signature in presence of two witnesses.

SILAS S. MYERS.

Witnesses:
E. S. WHITE,
E. H. TOMLINSON.